United States Patent [19]
Chotin et al.

[11] 3,915,682
[45] Oct. 28, 1975

[54] METHOD OF CONTROLLING GLASS TEMPERATURE IN A FOREHEARTH

[75] Inventors: Francois Chotin, Boulogne-Billancourt; Jean Paul Perot, Paris, both of France

[73] Assignee: Societe Generale Pour L'Emballage, France

[22] Filed: Aug. 3, 1973

[21] Appl. No.: 385,425

[30] Foreign Application Priority Data
Aug. 10, 1972 France ................ 72.28974

[52] U.S. Cl. .................. 65/29; 65/128; 65/162
[51] Int. Cl.² .......................................... C03B 5/24
[58] Field of Search ............... 65/128, 29, 161, 162

[56] References Cited
UNITED STATES PATENTS
2,081,595  5/1937  McIntosh .................. 65/162
3,321,288  5/1967  Griem, Jr. .................. 65/162
3,573,017  3/1971  Griem, Jr. .................. 65/29 X

*Primary Examiner*—Arthur D. Kellogg
*Attorney, Agent, or Firm*—Pennie & Edmonds

[57] ABSTRACT

The temperatures of glass delivered at the outlet from a forehearth including at least two series-connected thermally insulated sections and having in each section at least one temperature adjusting means responsive to the difference between a set point signal and an actual value signal is controlled by adjusting in at least one of the upstream sections a set point signal as a function of the difference between two signals characteristic of temperatures at two spaced points in a section downstream of the one to which such set point signal is applied.

9 Claims, 3 Drawing Figures

METHOD OF CONTROLLING GLASS TEMPERATURE IN A FOREHEARTH

The present invention pertains to a method of controlling and stabilizing the temperature of glass delivered from a conditioning channel at the outlet from a glass-melting furnace.

Typically, although not necessarily, such a channel is physically realized by a forehearth which receives at one end molten glass from the refining end of a glass tank or furnace and which at the other end delivers glass to a feeding device such as a plunger.

Such a channel should serve to supply glass making or glass working machinery with glass at a specified temperature and at a uniform flow rate, in order to permit the production of ware of uniform properties.

To this end such a channel normally includes a series of separate sections or parts whose temperatures are separately controlled.

One application of the invention lies in the manufacture of hollow-ware and it is with respect to such use that the invention will be described, although the invention is not limited thereto.

The forehearth of a glass-melting furnace includes a distribution channel which supplies a well having or leading to some form of feeder. The channel normally includes at least three thermally isolated, series-connected sections, each including one or more temperature-regulating devices such as sets of burners and, at least for the upstream section or sections, sets of cooling or ventilating nozzles.

Accepting the fact that local variations in temperature of the glass are inevitable for the reason, if for no other, that the glass at the surface of the current in the channel is not at the same temperature as the glass at the bottom thereof, such apparatus nevertheless makes it possible to impose on the current of glass, with greater or less success, a distribution of mean temperatures which is known lengthwise of the channel so as to produce at the outlet a flow of glass having the properties desired for the fabrication in view. The temperature control is customarily effected at least in part automatically. It employs regulating devices which receive, in addition to actual value, measured temperature-representative signals, set point or desired value signals corresponding to the theoretically desired temperatures at the points where the actual value temperatures are measured.

The set point values are chosen according to the constructional characteristics of the channel and according to the parameters of operation such as the nature of the glass, the rate of flow of glass through the channel, and the input and output temperatures. The set point values can be determined theoretically and adjusted empirically.

Customarily, control of the ventilation or cooling is effected manually. In the course of a given operating run, the attempt is usually made not to change the ventilation but to effect temperature regulation of the channel by operating on the supply of fuel to the burners.

One of the factors affecting homogeneity in the ware finally produced is the stability of the glass temperature at the feeder connection. Achievement of a desired degree of that stability requires that the variations in temperature, for example between the surface and the bottom of the channel at a given location along the length thereof, be progressively reduced upon approach to the feeder connection. Such uniformity in temperature with depth is however difficult to achieve in practice by reason of the very temperature changes which are to be effected in the channel.

It is an object of the present invention to correct the distribution of temperatures lengthwise of the channel, more precisely to make it possible to control under optimum conditions the deviations in temperature crosswise of the channel and beginning preferably with the upstream sections thereof. The invention is based upon the observation that, other things being equal, the variations in temperature recorded in a given zone of the channel depend upon the temperature profile lengthwise of the channel at points therein farther upstream. It is thus usually observed that the bottom temperature at a given point in the channel follows more closely than does the surface temperature there the temperatures farther upstream.

In accordance with the invention a mean temperature assigned as a set point value to a given location lengthwise of the channel, i.e. in a given section thereof, is adjusted as a function of the separation between temperatures characteristic of two spaced points farther downstream, in particular at the outlet of the thermally isolated section of the channel next farther downstream. In practice, this means modifying the set point values of some or all of the temperature regulating means in the given section as a function of a measure representative of this separation. The separation may be measured directly, or it may be deduced from a comparison of a signal representative of the temperature measured at one of the two points with a set point value corresponding either directly or indirectly to the temperature at the second of the two points. Such a mode of operation has the advantage of accelerating response of the system upon changes in its condition of operation such as the rate of flow of glass therethrough.

From another aspect therefore, and given the inevitable variation in temperature at any selected location lengthwise of the channel, the invention resides in separately measuring two temperatures taken to be characteristic of a given section of the channel and using one of these to correct the set point value for a temperature regulating means in that section while using the other of these measured temperatures to correct the set point values for a temperature regulating means operative in the sections of the channel farther upstream.

In accordance with the invention as applied to a glass flow channel of the known type hereinabove briefly described, the control chain operating on the burners of a given section of the channel is supplied with two set point values and with two corresponding measured values, one of which may represent, for example, the surface glass temperature in that section and the other of which may represent the bottom temperature in the next downstream section of the channel. Such a mode operation is applicable also to a channel having a more complex form of regulation such as that described in the French application No 72/28763, filed Aug. 9, 1972, and assigned to the assignee hereof.

BRIEF DESCRIPTION OF THE DRAWINGS

The invention will now be further described in terms of a number of presently preferred modes of practice thereof and with reference to the accompanying drawings wherein.

DESCRIPTION OF PREFERRED PRACTICE OF THE INVENTION

Figure 1:
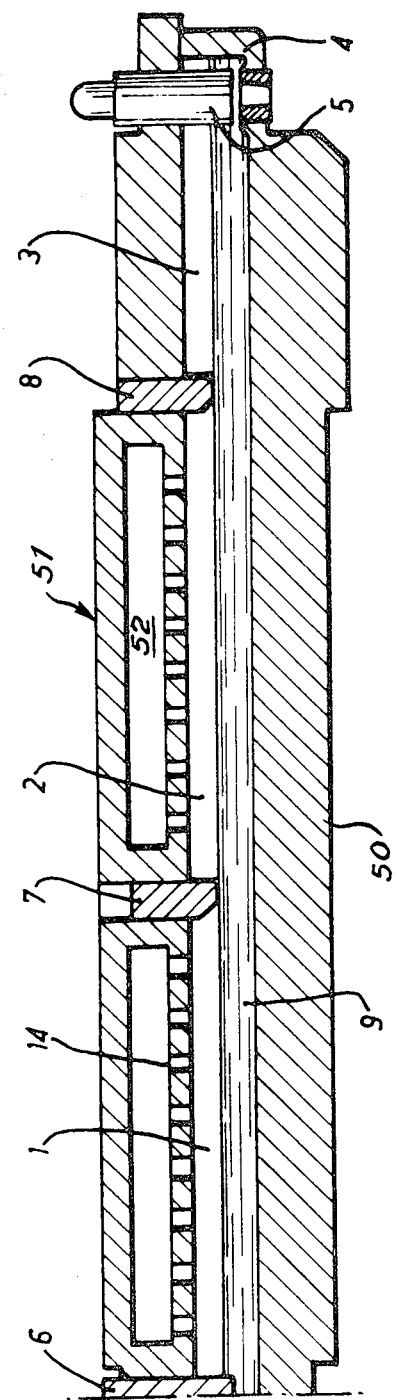
FIG. 1 is a diagrammatic longitudinal section of a forehearth to which the invention may be applied.

FIG. 1 illustrates diagrammatically a forehearth to which the invention may be applied. The forehearth connects at the left (in each of FIGS. 1 to 3) to a glass tank or furnace, not shown, via a bridge wall 6. The forehearth includes a floor 50, side walls not shown, and a crown or roof generally indicated at 51, with conduits 52 through which the ventilation or cooling air and the products of combustion are evacuated from above the glass bath 9 via openings 14.

Adjustable curtains 7 and 8, which may graze the surface of the bath 9, divide the forehearth and hence the channel defined by the forehearth into series-connected upstream, middle and downstream sections 1, 2 and 3, thermally isolated from each other. At the outlet end, at the right in FIGS. 1 to 3, a well 4 is equipped with a plunger 5, diagrammatically indicated, and capable of delivering uniform gobs or parisons of glass to glass forming or making machinery, not shown.

Figure 2:
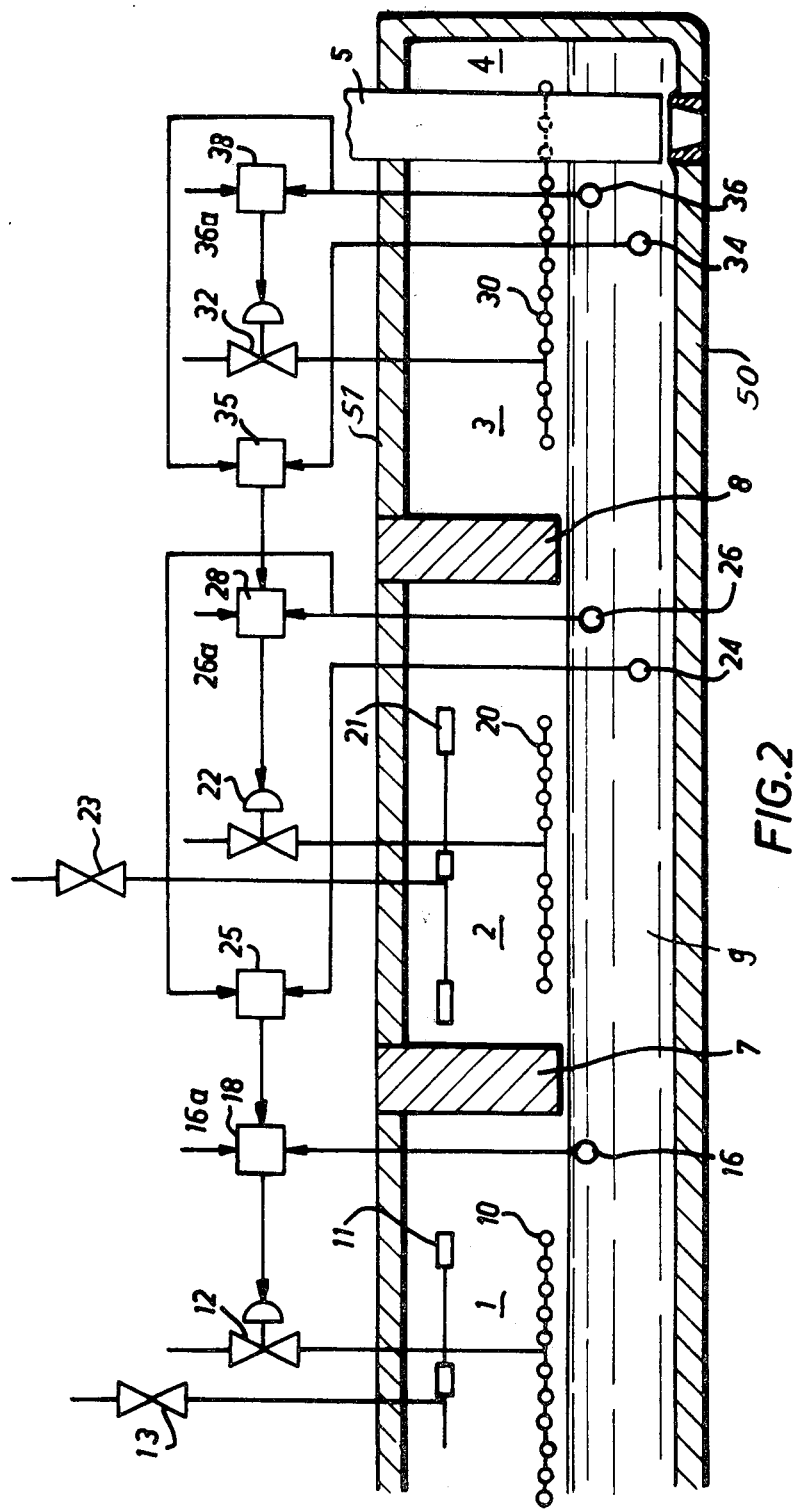
FIG. 2 is a diagrammatic longitudinal section of a forehearth illustrating the practice of the invention.

Referring now to FIG. 2 in which the showing of the roof 51 has been further simplified, each of the upstream and middle sections or chambers 1 and 2 is provided with at least two temperature regulating means. Two such temperature regulating means are illustrated in sections 1 and 2 in each of FIGS. 2 and 3.

In FIG. 2, for the chamber 1, one of these means includes two oppositely disposed rows of channel burners both controlled by a valve 12. One of these rows is diagrammatically indicated at 10. For chamber 1 in FIG. 2, the other illustrated temperature regulating means includes a series of ventilating ports or nozzles 11 controlled by a valve 13.

For the middle chamber or section 2, there are similarly two opposed rows of channel burners controlled by a valve 22 and a set of ventilating nozzles 21 controlled by a valve 23. The downstream section 3 includes a set of channel burners 30 controlled by a valve 32.

The valves 13 and 23 may be manually adjusted. The valves 12, 22 and 32 are adjusted by controllers 18, 28 and 38. These controllers receive each a temperature-representative signal from the associated one of the thermocouples 16, 26 and 36, measuring the temperature of the glass at the downstream end of the channel sections 1, 2 and 3 respectively whose burners are controlled by those controllers. These thermocouples may desirably measure the glass temperature at or near the surface of the bath and in mid-stream crosswise of the channel.

The controllers 18, 28 and 38 additionally receive set point signals at 16a, 26a and 36a respectively. These set point signals represent, subject to modification by additional signals to be described presently, the temperatures which it is desired to maintain at the corresponding measuring points indicated by thermocouples 16, 26 and 36 respectively. The controllers thus compare their set point signals with actual temperature signals from their thermocouples and adjust the burner control valves 12, 22 and 32 accordingly.

In accordance with one aspect of the invention however, the set point signals 16a and 26a of the upstream and middle sections are modified in accordance with a signal representative of the difference between the temperatures measured at two spaced points in the channel section next downstream. Thus in the case of the controller 18 for the upstream section 1, a controller 25 receives temperature-representative signals from the surface thermocouple 26 in section 2 and from a second thermocouple 24 also in section 2. Thermocouple 24 may for example measure the bottom temperature of the glass bath near the downstream end of the middle section 2 and at the middle of the channel transversely thereof. The regulator 25 develops from a comparison of the temperatures measured at the thermocouples 24 and 26 a correction signal which is delivered to the regulator 18 and which there effectively alters the set point signal 16a.

In similar fashion, the set point signal 26a for the regulator 28 of the mid-section 2 is adjusted in accordance with results of a comparison, effected by a regulator 35, of temperatures measured by thermocouples 34 and 36 at two spaced points in the section 3 which is downstream of the section 2 whose burner control valve 22 is controlled by the regulator 28. The thermocouple 34 may measure the temperature of the glass bath at the bottom of section 3 near the transverse middle of the glass flow and near the downstream end of the section 3.

Figure 3:
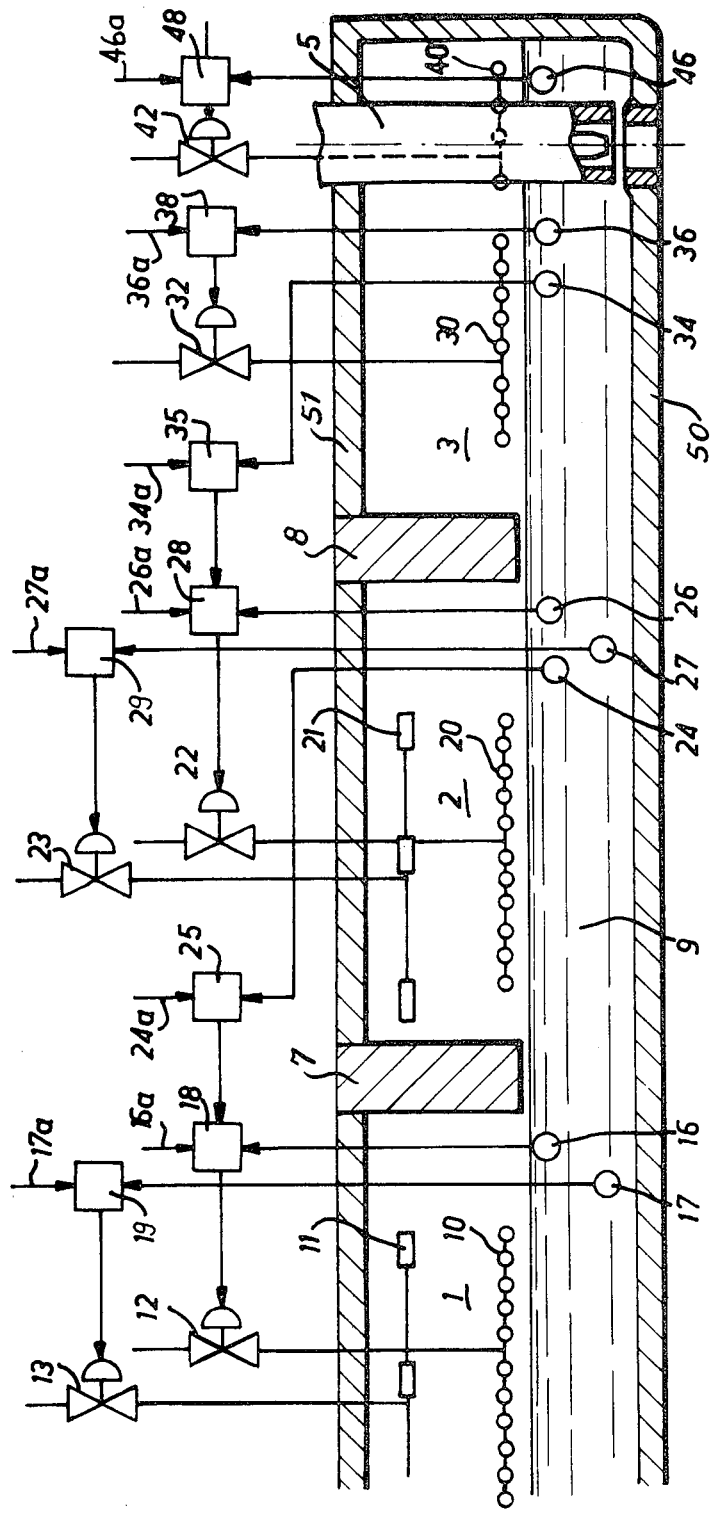
FIG. 3 is a further view similar to that of FIG. 2, but illustrating another mode of practice of the invention.

In the practice of the invention illustrated in FIG. 3 as in that illustrated in FIG. 2, the regulators 25 and 35 derive correction signals to the set point signals 16a and 26a for the upstream and middle sections 1 and 2. While as in FIG. 2, the regulators 25 and 35 in FIG. 3 receive actual value temperature-representative signals from thermocouples 24 and 34 in sections 2 and 3, they receive in addition set point signals 24a and 34a in place of signals from additional thermocouples 26 and 36 as in the practice illustrated in FIG. 2. By comparison with 26a and 36a the set point values 24a and 34a determine the departures in temperature which are allowed to develop between the measuring points 24 and 26 in section 2 and between the measuring points 34 and 36 in section 3 respectively. The thermocouples 24 and 34 may be positioned to measure the glass temperature at or near the surface of the bath and at or near one of the side walls of the channel.

In FIG. 3 the ventilation control valves 13 and 23 are not adjusted manually but by controllers 19 and 29 which receive actual value temperature-representative signals from thermocouples 17 and 27 and set point value signals at 17a and 27a. The thermocouples 17 and 27 may be disposed, for example, near the bottom of the bath in their respective sections 1 and 2 of the channel.

The downstream section 3 includes two separate firing controls, one operating on the upstream portion of that section and the other operating on the portion thereof adjacent the plunger 5. The first of these controls includes a controller 38 operatinng on the valve 32 for control of the burners 30. Controller 38 receives an actual value temperature-representative signal from a thermocouple 36 and a set point signal at 36a. The second of these controls includes a controller 48 operating on the valve 42 for the burner set 40. Controller 48 receives an actual value temperature-representative signal from thermocouple 46 and a set point signal at 46a. The portion of section 3 about plunger 5 is thus treated as a separate independent portion of the channel, held to a temperature defined by the set point signal at 46a.

While the invention has been hereinabove described in terms of a number of presently preferred modes of practice thereof, the invention itself is not limited thereto but rather comprehends all modification of and departures from those modes properly falling within the spirit and scope of the appended claims.

We claim:

1. A method of controlling the temperature of glass delivered at the outlet from a conditioning channel having at least two series-connected sections thermally insulated for each other and having in each section at least one temperature regulating means responsive to the difference between a set point signal and an actual value signal, which method comprises adjusting, at a temperature-regulating means operating in one of the upstream ones of said sections, the set point signal as a function of the difference between the temperatures measured at at least two spaced points in a section downstream of said one section.

2. A method according to claim 1 wherein said spaced points are adjacent the outlet from said downstream section.

3. A method according to claim 1 comprising the further step of using the temperature measured at one of said spaced points as the source of an actual value signal in controlling a temperature regulating means operating in said downstream section.

4. A method according to claim 1 wherein the actual value signal in said one section is derived from a temperature measured at the surface of the glass in said one section, and wherein at least one of said spaced points is at the bottom of said downstream section.

5. A method according to claim 1 wherein one of said spaced points is at the surface and the other is at the bottom of said downstream section.

6. A method according to claim 1 wherein one of said spaced points is at the edge of the channel and the other is at the middle of the channel.

7. A method according to claim 1 wherein the temperature regulating means at which the set point signal is adjusted is a burner means.

8. A method according to claim 1 wherein the temperature regulating means at which the set point signal is adjusted is a ventilating means.

9. A method of controlling the temperature of glass delivered at the outlet from a conditioning channel having at least two series-connected sections thermally insulated from each other and having in each section at least one temperature regulating means responsive to the difference between a set point signal and an actual value signal, which method comprises adjusting, at a temperature-regulating means operating in one of the upstream ones of said sections, the set point signal of said last-named temperature-regulating means as a function of the difference between the temperature measured at a point adjacent the downstream end in a section downstream of said one section and a set point value for said last-named temperature.

* * * * *